United States Patent [19]
Mui et al.

[11] Patent Number: 5,467,178
[45] Date of Patent: Nov. 14, 1995

[54] PRESSURE ROLLER FOR REDUCING MEDIA CURL AND WAVE IN ELECTROPHOTOGRAPHIC PRINTERS

[75] Inventors: Paul K. Mui, Boise; John W. Huffman, Meridian, both of Id.

[73] Assignee: Hewlett-Packard Company, Palo Alto, Calif.

[21] Appl. No.: 296,061

[22] Filed: Aug. 24, 1994

[51] Int. Cl.$^6$ .................................................. G03G 15/20
[52] U.S. Cl. ...................... 355/285; 355/282; 355/290; 355/295; 492/53; 492/56; 492/59
[58] Field of Search ...................... 355/282, 285, 355/289, 290, 295; 219/216; 492/53, 56, 59, 27

[56] References Cited

U.S. PATENT DOCUMENTS

| | | | |
|---|---|---|---|
| 3,750,246 | 8/1973 | Pessen | 492/53 X |
| 3,988,817 | 11/1976 | Thettu | 492/56 |
| 4,042,804 | 8/1977 | Moser | 219/216 |
| 5,195,430 | 3/1993 | Rise | 492/56 X |
| 5,229,813 | 7/1993 | Cherian | 492/59 X |
| 5,394,227 | 2/1995 | Huffman et al. | 355/285 |

FOREIGN PATENT DOCUMENTS

| | | | |
|---|---|---|---|
| 0716863 | 10/1954 | United Kingdom | 492/56 |

*Primary Examiner*—Matthew S. Smith
*Attorney, Agent, or Firm*—Anthony J. Baca

[57] ABSTRACT

In the typical fuser, the pressure roller is end mounted to the fuser assembly. Such a mounting creates a higher pressure on the ends of the roller. By removing deformable material from the ends, the pressure across the pressure roller can be equalized. An improved fuser assembly allows for the removal of the deformable material from the ends of the compliant hard fusing pressure roller. The improved fuser consists of the standard components of a fuser, namely a heated fuser roller and one or more pressure rollers. The pressure roller is constructed with a shaft on which a deformable material such as silicone rubber is formed around. A hard outer shell is then placed around the deformable material. The hard outer shell is longer than the deformable material thereby allowing the overall durometer hardness of the pressure roller to vary along the axis. Because the hard outer shell of the compliant hard pressure roller is formed from a malleable type material, it provides some compliance and therefor deforms slightly from roundness for small, sharp errors in the fuser roller or media. Larger errors such as out of roundness, or miss alignment between the compliant hard pressure roller and the fuser roller, are absorbed by the cylindrical deformable material.

7 Claims, 4 Drawing Sheets

PRESSURE ROLLER FOR REDUCING MEDIA CURL AND WAVE IN ELECTROPHOTOGRAPHIC PRINTERS

CROSS-REFERENCE TO RELATED APPLICATIONS

The present application is related to the following co-pending U.S. patent application being assigned to the same assignee, entitled:

"COMPLIANT HARD FUSING PRESSURE ROLLER FOR REDUCING MEDIA CURL AND WAVE IN ELECTROPHOTOGRAPHIC PRINTERS." (U.S. Pat. No. 5,394,227 issued Feb. 28, 1995).

TECHNICAL FIELD

This invention relates generally to electrophotographic printing also known as laser printing and more particularly to an improved fusing roller for use in the output paper path of the desk top type laser printer. This arrangement is useful to reduce curl and wave produced by the fuser system used in these printers.

BACKGROUND OF THE INVENTION

With present technology laser printing systems, it is common practice to pass the printed media or paper with the just printed text or graphics between a fuser roller and idler pressure roller to burn in or fuse in the text or graphics on the media. This eliminates the possibility of smearing the media thus enhancing the permanent nature of the generated document. As the media leaves the surface of the photoconductive drum and transfer rollers, it is guided into the fuser. In the fuser the media is compressed between a pressure roller and a fuser roller. The fuser roller is heated to a temperature of about 180 degrees Celsius. At this temperature, the toner liquefies thereby fusing to the media. To insure high print quality, the toner must be evenly fused to the paper.

To allow for machining tolerances and assembly errors in the fuser roller itself, the pressure roller has generally been made of a compliant material. Because the pressure roller is made of such material it tends to deform as it presses against the fuser roller. As the paper passes between the fuser roller and a pressure roller, a fixed amount of the media is held in contact with the fuser roller. This point of contact is also known in the art as nip.

While the compliant pressure roller may reduce manufacturing tolerances in the fuser roller itself, it also tends to widen the nip width on the printed media. Additionally, because the clamping and loading forces between the fuser roller and the pressure roller are applied at the ends, the nip width varies across the length. If a completely non-compliant pressure roller is used, the nip width can be reduced to a minimum and kept even. However, with this arrangement the necessary manufacturing tolerance on the fuser assembly makes the system un-manufacturable in mass quantities. If the tolerances are not accounted for, the pressure seen by the media may vary significantly both longitudinally and laterally along the media adversely affecting the print quality.

As the nip width increases, the amount of the print media in contact with the hot fuser roller increases. This translates into a proportional amount of the print media being subjected to the curvature of the fuser roller. Thus the print media is simultaneously exposed to high temperature and curve. As the print media and toner cool, the media is susceptible to retaining the contour of the fuser roller. The net result of this operation is the production of an undesirable curl in the print media. This curl may then hinder subsequent paper handling devices such as photocopying, facsimile machines or the like.

If the nip width is not maintained across the media and down the media, the media tends to deform in a different manner. This uneven nip width, which is generally caused by a varying pressure between the pressure roller and the fuser roller, introduces a characteristic wave in the print media. Wave differs from curl in that wave generally is more of an oscillating type distortion. However, wave can also hinder subsequent paper handling devices. Additionally, a wave gives a document stack a less than professional appearance.

SUMMARY OF THE INVENTION

In order to accomplish the objective of the present invention, there is provided an improved fuser apparatus in the electrophotographic printer. This improved fuser apparatus reduces both curl and wave deformations in electrophotographically printed media.

The improved fuser consists of the standard components of a heated fuser roller and pressure roller. The pressure roller is constructed with a central rotation shaft, a cylindrical deformable material, such as silicone rubber, is formed around the central rotation shaft and a cylindrical hard outer shell is formed around the deformable material. Both the pressure and heated fuser rollers are rotated about their respective axis. The printed media is compressed between the pressure roller and the heated fuser roller thereby fusing the image onto the printed media while the media is transported within the printer.

In the typical fuser, the pressure roller is end mounted to the fuser assembly. Such a mounting creates a higher pressure on the ends of the roller. A benefit provided by the present invention is the ability to easily create specific pressure profiles exerted by the pressure roller. Various profiles can be obtained by simply removing portions of the deformable material under the hard outer shell. For example, by removing deformable material from the ends, the pressure across the pressure roller can be equalized.

As an additional benefit, by using a harder pressure roller the nip width can be reduced while maintaining the same pressure against the fuser roller. The hard pressure roller allows for tighter control of the nip width along the print media. Thus by stricter control of the nip width, the characteristic curl and wave normally induced into the print media are greatly reduced.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

Figure 1:
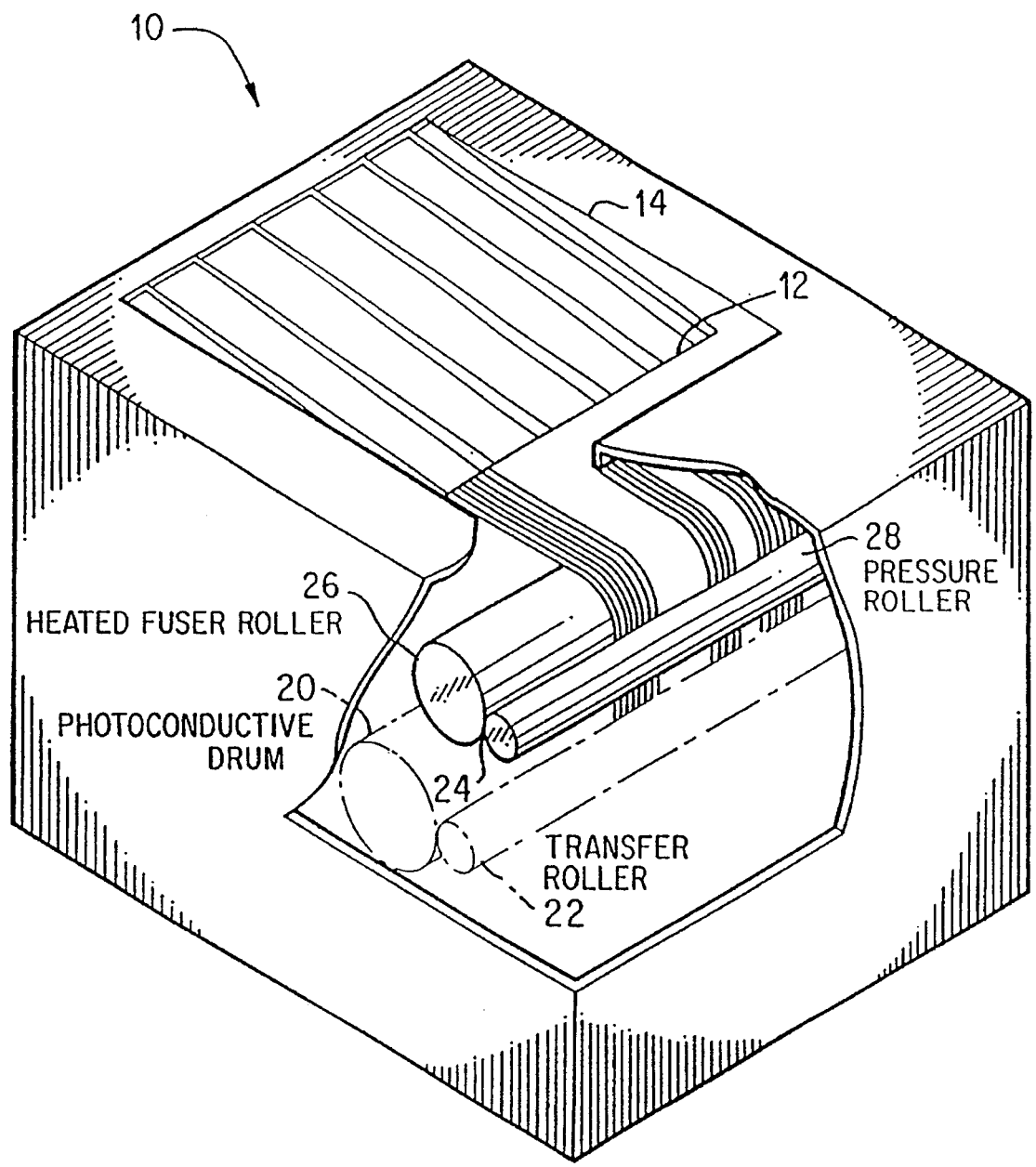
FIG. 1 is a cut away isometric view of an electrophotographic printer housing showing the paper path through the fuser in accordance with the present invention.

Referring first to FIG. 1, where a desk top laser printer 10 with a cutaway view is shown. For simplification of FIG. 1, much of the mechanical detail has been omitted. One skilled in the art of electrophotographic printing will understand that this figure is a simplified diagram used to orient the reader as to the function of the present invention.

To print an image, print media 12 is extracted from a paper supply not shown in FIG. 1. The image is first imaged onto photoconductive drum 20 by techniques understood by those skilled in the art. As the media passes between photoconductive drum and transfer roller 22, the image is transferred from the photoconductive drum to the media 12. Media 12 next is guided to fuser 24 after it leaves the photoconductive drum 20 and transfer roller 22.

FIG. 1 shows that the media is sandwiched between the fuser roller and the pressure roller as it passes through the fuser. Because of the high temperature of the fuser, the image is fused onto the print media. Print media 12 leaves the fuser and continues along the paper path guided by suitable media guide means such as guide 50. Other guide means are not shown in FIG. 1. Print media 12 is finally deposited in the output tray 14. One embodiment of the present invention uses a heated fuser roller 26 and single pressure roller 28. Other embodiments may use more than one pressure roller.

Figure 2:
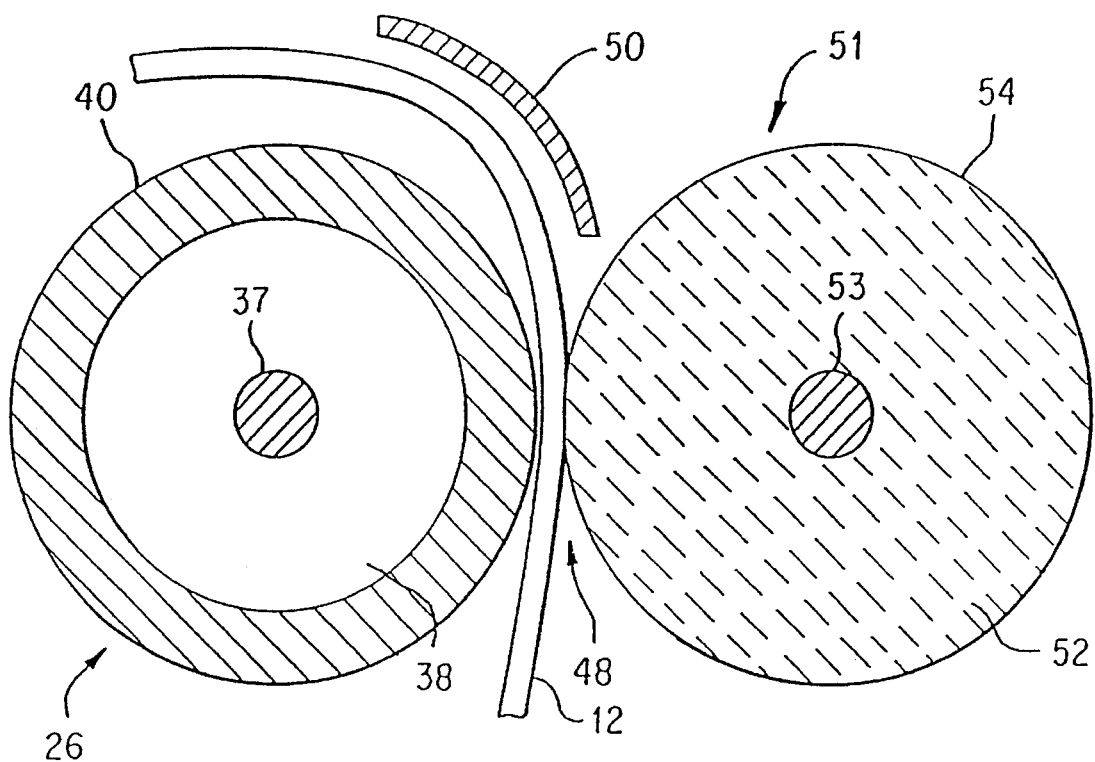
FIG. 2 is a cross sectional view of the fuser roller and pressure roller showing the reduced nip width in accordance with the present invention.

Referring next to FIG. 2, there is shown an enlarged cross sectional view of the fuser roller 26 and compliant hard idler pressure roller 51 of the present invention. The fuser roller 26 includes a quartz lamp 37 mounted at the center axis. Radiant heat from the quartz lamp 37 travels through open space 38 to heat the outer cylindrical roller member 40. As with the prior art, the present invention pressure roller includes a central rotation shaft 53 and again is coated with a deformable material 52 such as silicone type rubber. A hard shell 54 is placed over the top of the silicone rubber 52. This hard shell can be made of many materials. In the present invention brass was chosen because it is fairly rigid with some compliance and not brittle. Other materials also exhibit these properties, but may not be as easily machined to fit over the silicone rubber 52.

While using a brass tube with a thickness of about 0.3 mm to about 0.5 mm, the nip width has been reduced by approximately one half while maintaining the same fuser pressure of the compliant pressure roller. Not shown in FIG. 2, it has been determined that placing a coating of a non-stick surface around the hard shell of the pressure roller greatly reduces the chances of the print media adhering to the pressure roller. The hot roller 40 may also have such a coating placed on it.

Figure 3:
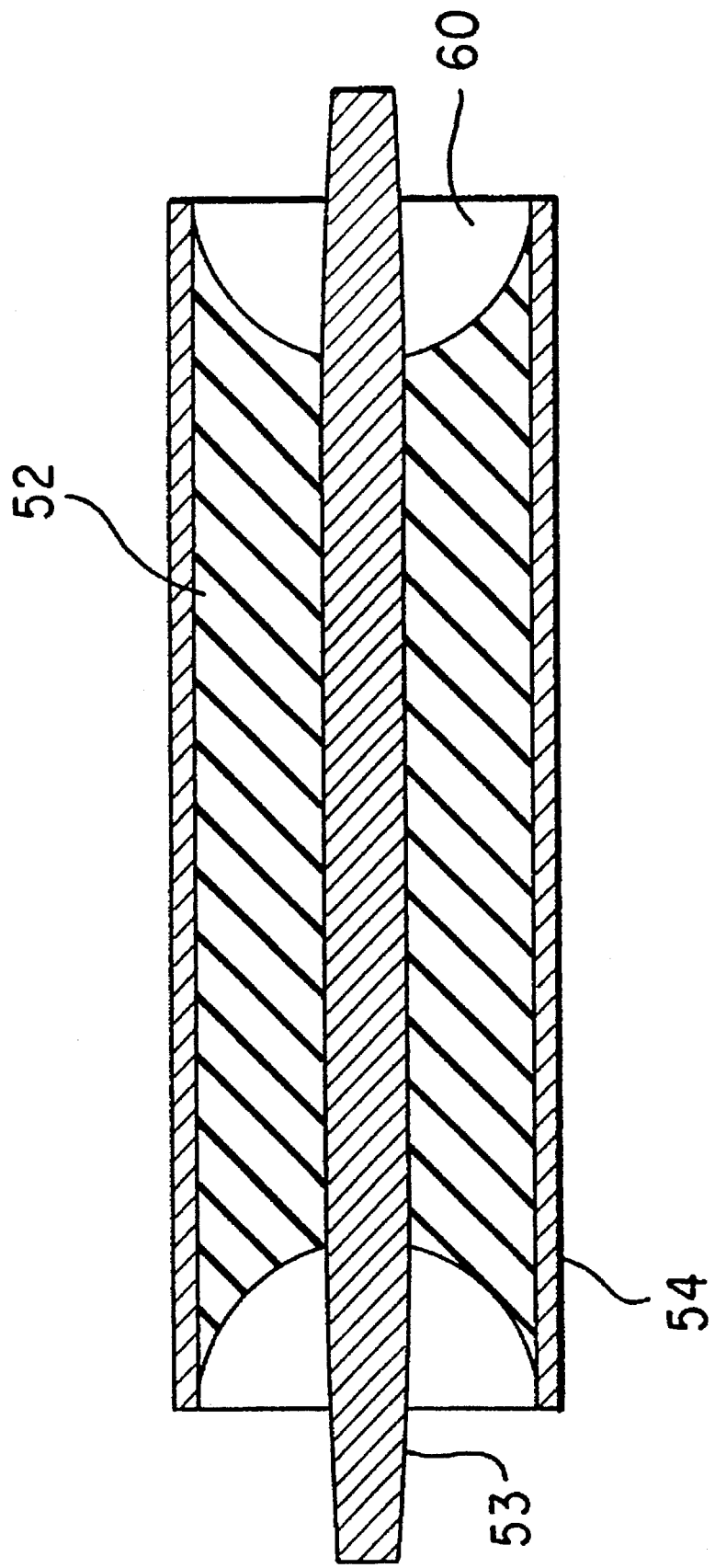
FIG. 3 is a cross sectional view of the pressure roller.

Referring now to FIG. 3, by using the hard outer shell, the pressure applied against the fuser roller can be contoured to best fit the particular application. In the typical fuser, the pressure roller is end mounted to the fuser assembly. Such a mounting creates a higher pressure on the ends of the roller. By removing 60 some of the silicone rubber 52 under the hard shell 54, the pressure can be equalized across the fuser. Thus, the nip width remains constant across the length of the pressure roller. It should be noted that the shape of the cavity 60 shown in FIG. 3 may be any shape. One skilled in the art would generally do a Finite Element Analysis to determine the exact shape and amount of material to remove to produce the desired nip width profile.

Figure 4:
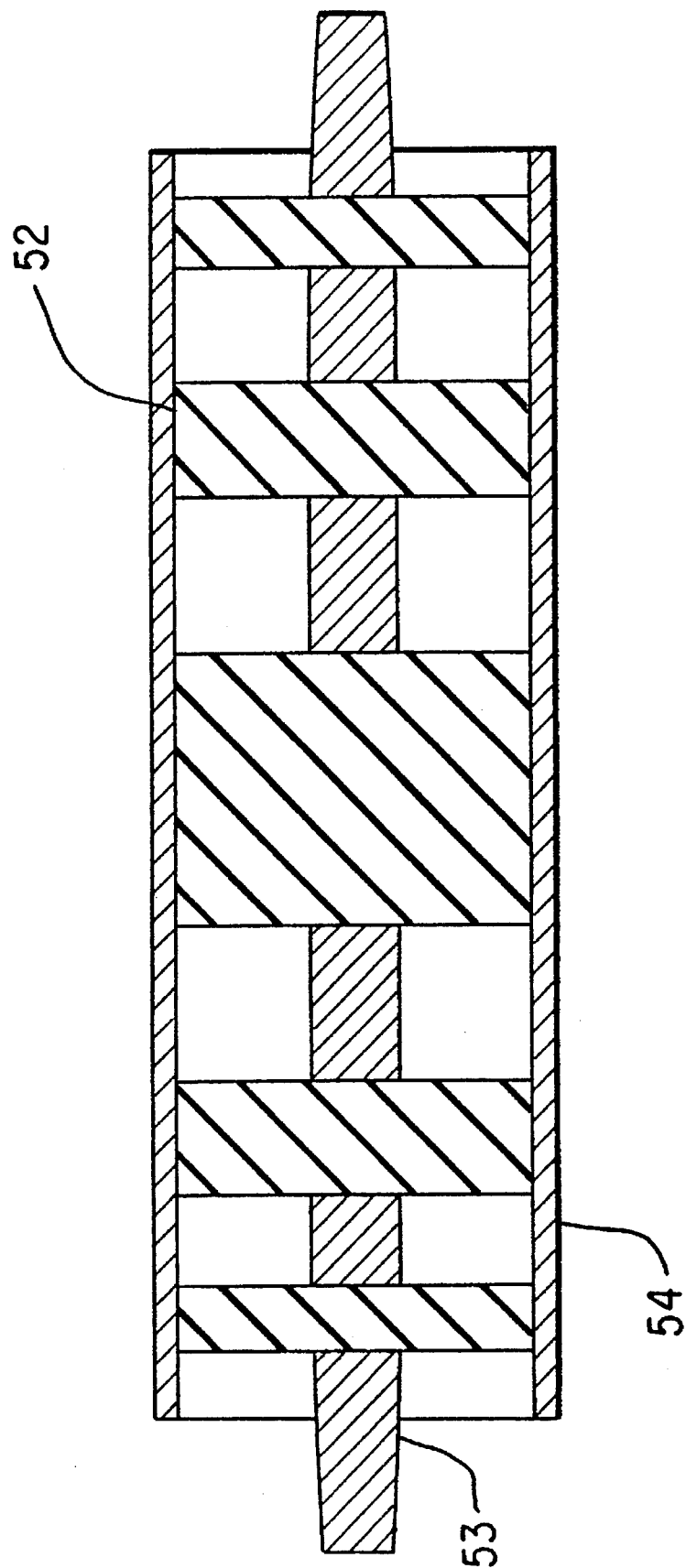
FIG. 4 shows an embodiment of a pressure roller in accordance with the present invention.

Other applications may require a particular pressure profile. Such profiles can easily be obtained by simply removing sections of the silicone rubber. For example, if less pressure is need in the center of the roller, the silicon rubber 52 could be removed in the center. Other possible alternative arrangements might include using disks of the silicon rubber (see FIG. 4) to thereby increase the pressure or force under the outer shell.

Although the preferred embodiment of the invention has been illustrated, and that form described, it is readily apparent to those skilled in the art that various modifications may be made therein without departing from the spirit of the invention or from the scope of the appended claims.

What is claimed is:

1. An apparatus operative within an electrophotographic printer for reducing deformation in electrophotographically printed media, said apparatus comprising of:

a fuser roller on a first side of media transport path, said fuser roller being rotated about an axis of rotation longitudinally along an axis of said fuser roller; and a pressure roller on a second side of said media transport path and positioned adjacent to said fuser roller, said pressure roller comprised of a shaft, a cylindrical deformable material formed around said shaft, said cylindrical deformable material having a center section and a first end and a second end, a cylindrical hard outer shell formed around said deformable material, said cylindrical deformable material being removed from said first end and said second end so that said cylindrical deformable material is shorter than said cylindrical hard outer shell; and said pressure roller being rotated about an axis of rotation longitudinally along an axis of said shaft, said printed media being compressed between said pressure roller and said fuser roller.

2. The apparatus as claimed in claim 1 wherein said cylindrical deformable material is rubber.

3. The apparatus as claimed in claim 1 wherein said cylindrical hard outer shell being constructed from brass having a thickness of about 0.3 mm to about 0.5 mm.

4. The apparatus as claimed in claim 1 further comprising a media guide arranged to receive said printed media and deflect said printed media.

5. An apparatus operative within an electrophotographic printer for reducing deformation in electrophotographically printed media, said apparatus comprising of:

a fuser roller being rotated about an axis of rotation longitudinally along an axis of said fuser roller; and a pressure roller adjacent to said fuser roller, said pressure roller comprised of a shaft, a cylindrical rubber material of length L formed around said shaft, a hard outer shell of length L+S formed around said rubber material, where S is a positive number, said pressure roller being rotated about an axis of rotation longitudinally along an axis of said shaft, said printed media being compressed between said pressure roller and said fuser roller, said printed media having a first side on which an image has been applied and a second side, said first side being in contact with said fuser roller and said second side being in contact with said hard outer shell of said pressure roller, heat from said fuser roller and pressure from said pressure roller fuses said image to said printed media.

6. The apparatus as claimed in claim 5 wherein said hard outer shell being constructed from brass having a thickness of about 0.3 mm to about 0.5 mm.

7. The apparatus as claimed in claim 5 further comprising a media guide arranged to receive said printed media and deflect said printed media.

* * * * *